United States Patent [19]

Maida et al.

[11] Patent Number: 4,630,917

[45] Date of Patent: Dec. 23, 1986

[54] EXPOSURE CONTROL DEVICE OF A CAMERA

[75] Inventors: Osamu Maida, Tokyo; Takashi Saegusa, Kawasaki, both of Japan

[73] Assignee: Nippon Kogaku K. K., Tokyo, Japan

[21] Appl. No.: 650,226

[22] Filed: Sep. 13, 1984

[30] Foreign Application Priority Data

Sep. 20, 1983 [JP] Japan ................................ 58-173666

[51] Int. Cl.[4] .................................................. G03B 7/08
[52] U.S. Cl. ...................................... 354/456; 354/458; 354/432; 354/464
[58] Field of Search ................ 354/458, 441, 444, 445, 354/446, 451, 452, 456, 464, 429, 432

[56] References Cited

U.S. PATENT DOCUMENTS

| | | | |
|---|---|---|---|
| 3,899,788 | 8/1975 | Toyoda | 354/458 |
| 4,072,962 | 2/1978 | Maida | 354/451 |
| 4,462,670 | 7/1984 | Maida | 354/432 |

Primary Examiner—Russell E. Adams
Attorney, Agent, or Firm—Shapiro and Shapiro

[57] ABSTRACT

A camera in which the exposure of a film is controlled includes means for making a digital signal, converting means for converting the digital signal from the making means into an analog signal and putting out the analog signal, means for detecting the brightness of an object to be photographed and producing an analog brightness signal indicative of the detected brightness of the object to be photographed, means for comparing the analog signal from the converting means with the brightness signal, the means being adapted to put out a comparison signal when the analog signal from the converting means and the brightness signal assume a predetermined relation, the making means putting out to the converting means a digital signal indicative of exposure information concerned in the control of the exposure of the film on the basis of the digital signal made by the making means when the comparison signal is put out, the converting means converting the digital signal indicative of the exposure information into an analog signal, and means for controlling the exposure of the film on the basis of the exposure information converted into the analog signal.

29 Claims, 4 Drawing Figures

EXPOSURE CONTROL DEVICE OF A CAMERA

BACKGROUND OF THE INVENTION

1. Field of the Invention

This invention relates to an exposure control device of a camera.

2. Description of the Prior Art

In recent years, many cameras have come to be provided with both an analog circuit and a digital circuit. The digital circuit is used primarily for the digital display of exposure information, and the analog circuit is used for the exposure control because of its quick responsiveness.

The exposure control system, more particularly a program exposure control system in which a diaphragm is automatically controlled from the measured value of the brightness of an object to be photographed and then the object light passed through the diaphragm is remetered and the shutter is automatically controlled, automatically controls both of the diaphragm and the shutter in one cycle of exposure control. It is desirable, in simplifying the circuit construction, that the exposure information used in common for the control of the diaphragm and the shutter be stored in common and be input to the diaphragm analog operation circuit and the shutter analog operation circuit as required, rather than that such exposure information be individually introduced into the diaphragm analog operation circuit and the shutter analog operation circuit in advance. However, storage of accurate analog information for a relatively long time is very difficult and to achieve this, there is a problem in that the circuits become very much complicated.

SUMMARY OF THE INVENTION

It is an object of the present invention to provide an exposure control device of a camera which can execute the analog control of the diaphragm and the analog control of the shutter on the basis of stored exposure information.

To achieve the above object, the exposure control device of a camera in accordance with the present invention for automatically controlling the diaphragm and the shutter in one photographing operation is provided with a diaphragm analog control circuit for controlling the diaphragm, a shutter analog control circuit for controlling the shutter, a digital memory for storing therein exposure information as a digital value, and a D/A converting circuit for converting the digital value into an analog value. The device is constructed so that the exposure information stored in the memory is converted into an analog value by the D/A converting circuit, the analog value is supplied to the diaphragm analog control circuit, and then the exposure information is converted into an analog value by the D/A converting circuit and the analog value is supplied to the shutter control circuit.

The invention will become more fully apparent from the following detailed description thereof taken in conjunction with the accompanying drawings.

DESCRIPTION OF THE PREFERRED EMBODIMENT

Figure 1:
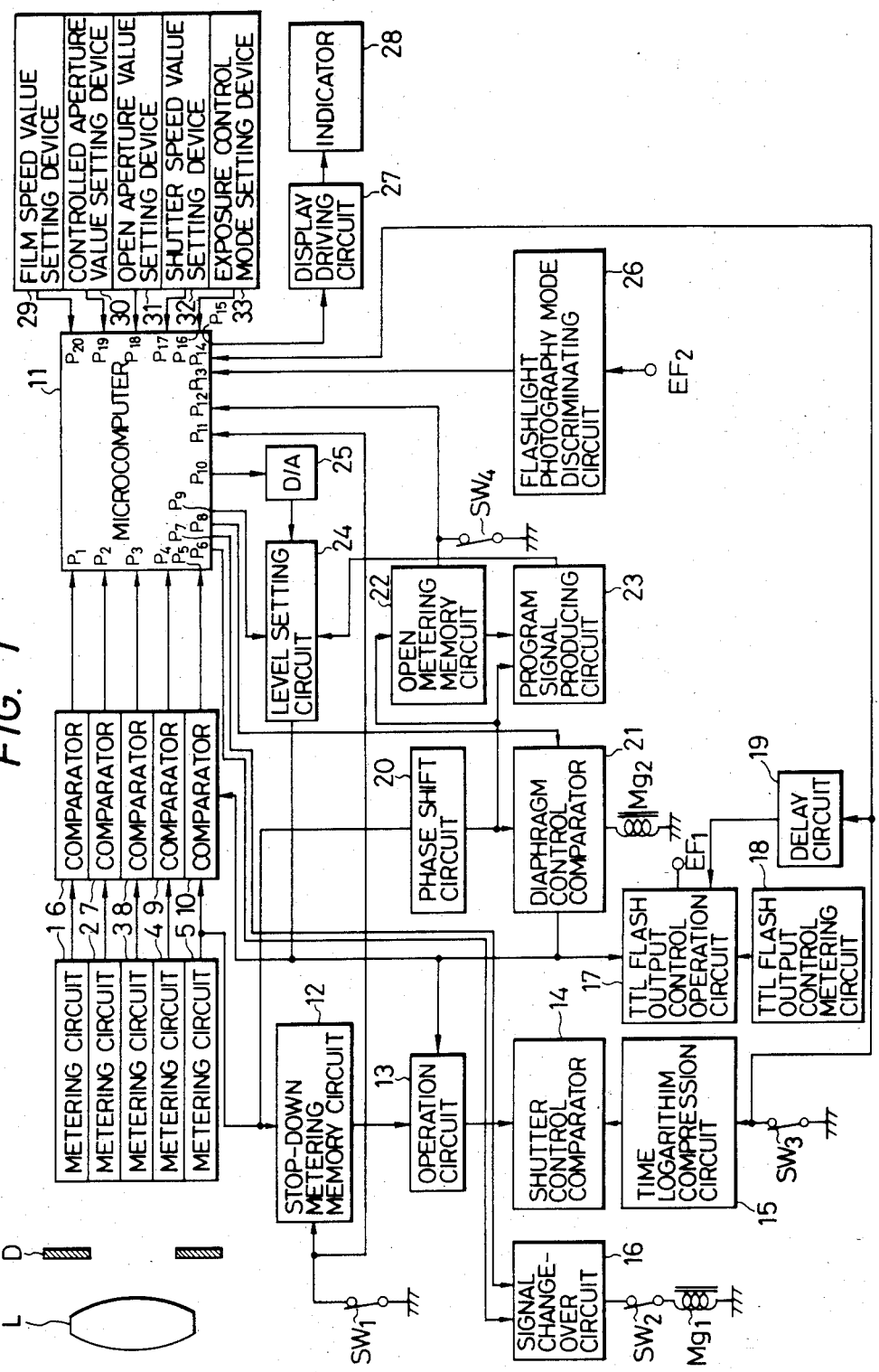
FIGS. 1 and 2 are a block diagram and a circuit diagram, respectively, showing an embodiment of the present invention.

FIG. 1 is a block diagram of a single lens reflex camera according to the present invention. In this embodiment, automatic correction control of the exposure level by multi-metering, shutter priority control and aperture priority control by momentary stop-down metering, program control, manual control and multi-mode exposure control by TTL flash output control are possible. The multi-metering as is apparent from U.S. Pat. No. 4,412,730 comprises discerning the property of the brightness distribution of a scene to be photographed by metering the scene to be photographed while dividing it into a plurality of portions, thereby determining the exposure level which is optimum.

In FIG. 1, the arrows indicate the direction in which a signal flows.

The outputs of metering circuits 1, 2, 3, 4 and 5 are connected to the inputs, respectively, of comparators 6, 7, 8, 9 and 10 forming a part of A/D converting means to effect the operational processing by a microcomputer 11, and the outputs of the comparators 6–10 are connected to the input ports $P_1$–$P_5$, respectively, of the microcomputer 11. The metering circuits 1–5 effect metering in a predetermined divided range correspondingly to the photographic picture plane on the basis of a light passed through the diaphragm D of a photo-taking lens L for the aforementioned multi-metering. The metering circuit 5 meters the central portion of the photographic picture plane which is good in stop-down linearity (the linearity of the variation in metering output corresponding to a variation in the diaphragm), and the other metering circuits 1–4 meter the circumference of the central portion of the picture plane. A stop-down metering memory circuit 12 stores therein the output of the metering circuit 5 in the central portion of the picture plane after the diaphragm of the lens has been controlled when a stop-down memory switch SW1 is in its OFF position. The stop-down memory switch SW1 is normally closed and becomes open just before a reflecting mirror for directing light to a finder portion, not shown, and a metering portion retracts from the optical path of the photo-taking lens and the optical path changes over to the photographing side after the camera has been released and the control of the diaphragm of the lens has been completed, and the OFF position of the switch SW1 continues until the shutter is closed and exposure control is completed. When the exposure is completed and the reflecting mirror comes into the optical path of the photo-taking lens, the stop-down memory switch SW1 becomes closed and ready for the next photographic. The closing-opening of the stop-down memory switch SW1 is connected to the input port P11 of the microcomputer and provides a control signal for changing over the set information of a digital-to-analog converting circuit (hereinafter referred to as the D/A) 25 as will later be described. An operation circuit 13 effects an apex operation between the output of the stop-down metering memory circuit 12 and the output of a level setting circuit 24 to be described and provides a signal of the shutter control time to one input of a shutter control comparator 14. A time logarithm compression circuit 15 produces an output voltage proportional to the logarithm of the time lapse from the opening of a trigger switch SW3 corresponding to the opening starting operation of the focal plane shutter and applies this output voltage to the comparator 14. The ON-OFF signal of the trigger switch SW3 is also transmitted to a delay circuit 19 which determines the integration starting timing for the TTL flash output control and to the input port $P_{14}$ of the microcomputer 11. By the signal transmitted to the input port $P_{14}$ of the microcomputer 11, counting of the shutter time manually set in the manual control mode or of the tunable shutter time during flashlight photography is started in the microcomputer 11. The time signal counted by the microcomputer 11 is transmitted from an output port $P_7$ to a signal change-over circuit 16. The signal change-over circuit 16 selects one of the time signal output of the shutter control comparator 14 and the time signal of the output port $P_7$ of the microcomputer 11 by a selection signal put out from the output port $P_6$ of the microcomputer 11 and controls a shutter control electromagnet Mg1 through a shutter switch SW2. This electromagnet Mg1 determines the point of time at which the shutter is to be closed. The shutter switch SW2 is synchronized with the aforementioned stop-down memory switch and the ON-OFF phase relation of these switches is reverse. The light emission stop control for effecting TTL flash output control during flashlight photography is effected by a TTL flash output control operation circuit 17, a TTL flash output control metering circuit 18 and a delay circuit 19. The TTL flash output control metering circuit 18, as is well known, meters the reflected light from the film surface provided by the light passed through the diaphragm of the lens. The delay circuit 19 puts out an integration starting signal when a predetermined time has elapsed after the opening of the trigger switch SW3, and more specifically, when the shutter has become fully open. In synchronism with the production of the integration starting signal, a conventional synchro switch, not shown, is closed and the closing thereof is transmitted to a flash unit and light emission is started. The TTL flash output control operation circuit 17 starts the operation by the output of the TTL flash output control metering circuit 18 and the output of a level setting circuit to be described and also starts the integrating operation by the integration starting signal put out from the delay circuit 19, and when a predetermined exposure amount is reached, it puts out a light emission stop signal to a hot shoe contact $EF_1$ for electrical connection with the flash unit, not shown, thereby effecting the operation of stopping the light emission of the flash unit. A phase shift circuit 20 for advancing the phase eliminates the diaphragm control error resulting from the delayed control of the diaphragm control mechanism in a mode wherein the control of the diaphragm by momentary stop-down metering is effected, and the output of the phase shift circuit 20 is the same as the output of the metering circuit 5 when the output of the metering circuit 5 does not vary. As the diaphragm is stopped down with lapse of time after the camera has been released, the output of the metering circuit varies and the output of the phase shift circuit 20 varies earlier than the input thereof in accordance with the characteristic of the variation in the output of the metering circuit with time. A diaphragm control comparator 21 for effecting diaphragm control compares the output of the phase shift circuit 20 with the output of the level setting circuit 24 and when these two outputs become equal, it supplies electric power to a diaphragm control electromagnet Mg2 and stops the stopping-down operation of the diaphragm. The diaphragm control comparator 21 also effects the setting as to whether it permits the supply of electric power to the electromagnet Mg2 by the control signal of the output port $P_8$ of the microcomputer 11. For example, in the exposure mode wherein electrical diaphragm control is not effected, the supply of electric power to the electromagnet Mg2 is unnecessary, or in the mode of electrical diaphragm control, the supply of electric power to the electromagnet during a period other than a particular period in the operation sequence of the camera wherein diaphragm control is effected is unnecessary and therefore, the setting for forcibly cutting off the supply of electric power to the electromagnet Mg2 is effected independently of the comparison operation output of the diaphragm control comparator.

The diaphragm control electromagnet Mg2 is usually a permanent magnet bias type electromagnet and when electric power is supplied to the electromagnet Mg2, the diaphragm restraining operation of a diaphragm control mechanism, not shown, is effected. An open metering memory circuit 22 is a metering value memory circuit for program control, and stores the output value of the phase shift circuit 20 for a period during which an open metering memory switch SW4 is open and puts out the output value to a program signal producing circuit 23. The ON-OFF timing of the open metering memory switch SW4 is such that the switch is closed in the normal state and, when the camera is released, the control of the diaphragm is started, and this switch SW4 is opened just before the diaphragm is stopped down, and the OFF position of said switch is maintained until the diaphragm control is completed thereafter and the reflecting mirror retracts from the optical path and the shutter is controlled and the reflecting mirror comes back into the optical path to return to a diaphragm opening position. That is, the metering value based on the open value of the lens diaphragm when the camera has been released is stored.

The ON-OFF signal of the open metering memory switch SW4 is transmitted to the input port $P_{12}$ of the microcomputer 11. The program signal producing circuit 23 produces a diaphragm control signal for effecting program exposure control. The level setting circuit 24 is a circuit for converting the output of the digital-to-analog converting circuit 25 into a predetermined level in accordance with each exposure control mode and the timing of each exposure control sequence. The control thereof is effected by the output of the output port $P_9$ of the microcomputer 11. The digital-to-analog converting circuit 25 has its analog output signal controlled by the microcomputer 11. A flashlight photography mode discriminating circuit 26 is a circuit for receiving a signal transmitted from the flash unit, not shown, through the hot shoe contact $EF_2$, discriminating whether the flash unit is in its operative condition with the main switch thereof closed and transmitting the output thereof to the input port $P_{13}$ of the microcomputer 11 to thereby automatically change over the camera to the flashlight photography mode. A display driving circuit 27 effects the display driving, through an indicator 28, of the predetermined control value of a controlled exposure factor (the value of shutter time or the value of diaphragm control) for automatic exposure operated by the microcomputer 11, or the value of deviation from the combination of proper exposures during the manual control mode. A film speed value setting device 29 introduces the manually set value or the film speed value read by the unshown automatic film speed reading mechanism of the camera into the microcomputer 11 through the input port $P_{20}$ thereof for the purposes of exposure control and display control. A controlled aperture value setting device 30 introduces the step difference values from the open aperture value controlled by the aperture preset ring of the lens to the aperture value by the preset aperture ring into the microcomputer 11 through the input port $P_{19}$ thereof. An open aperture value setting device 31 introduces the open aperture value of the lens into the microcomputer 11 through the input port $P_{18}$ thereof. A shutter speed value setting device 32 sets the shutter speed value during the manual mode control or the shutter speed value during the shutter priority mode and introduces the set value into the microcomputer 11 through the input port $P_{17}$ thereof. An exposure control mode setting device 33 introduces which of the manual control mode, the shutter priority mode, the aperture priority mode and the program control mode is selected into the microcomputer 11 through the input port $P_{16}$ thereof. Each of the input and output ports $P_1$–$P_{20}$ of the microcomputer 11 actually comprises a plurality of ports, but in FIG. 1, all of them are shown as a single port to show the flow of signals. Also, the microcomputer 11 additionally has control input terminals such as a reset terminal, a stand-by terminal and a clock input terminal, but these terminals are not shown in FIG. 1.

Figure 2:
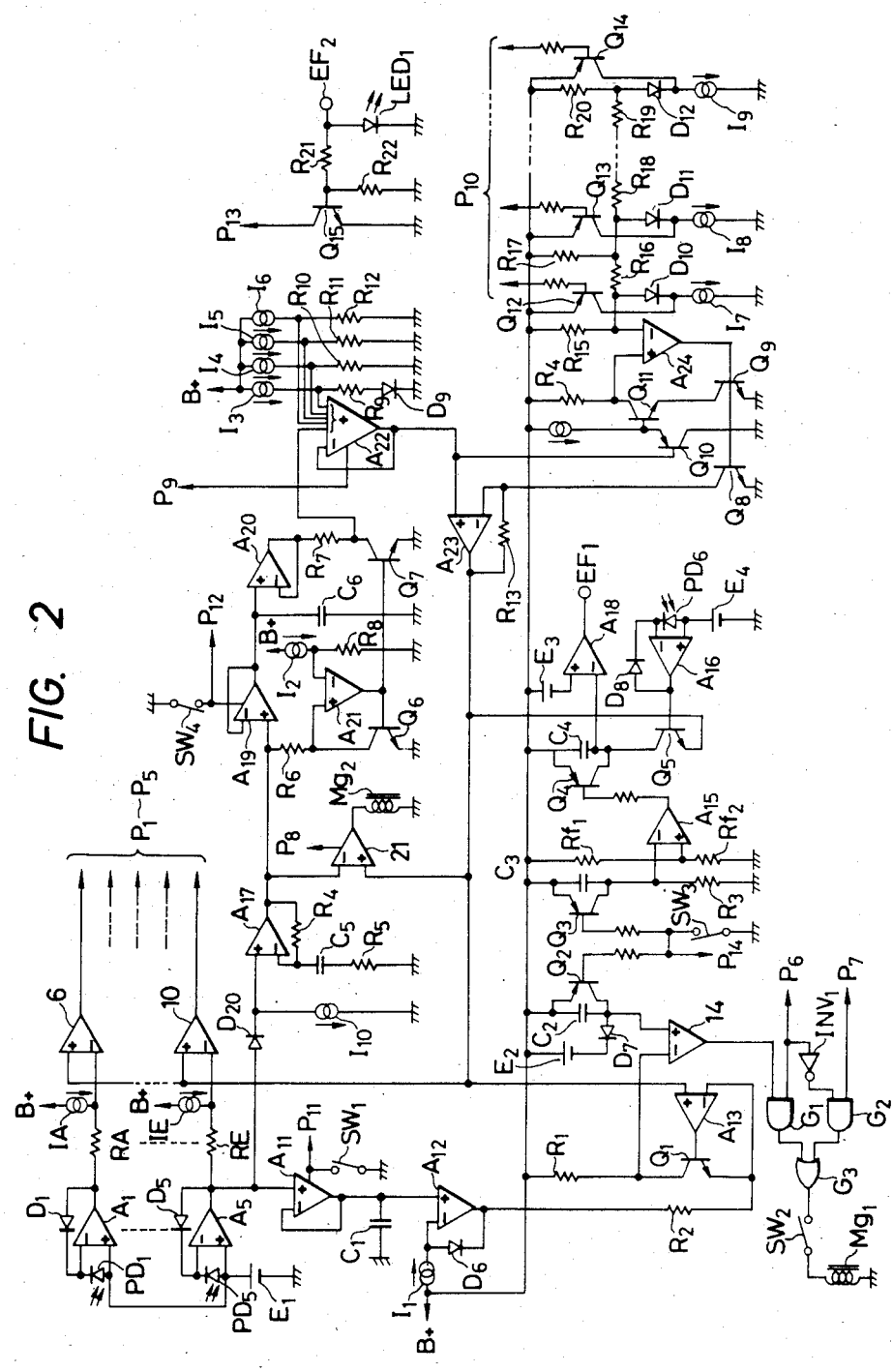

FIG. 2 shows a specific example of the construction of FIG. 1, and the correspondence between FIGS. 1 and 2 is as follows.

In FIG. 2, the microcomputer 11 of FIG. 1 is omitted, and $P_1$–$P_{14}$ in the circuit diagram of FIG. 2 correspond to the input and output ports of the microcomputer 11 of FIG. 1. Also, in FIG. 2, reference characters similar to those in FIG. 1 designate circuit elements similar to those of FIG. 1.

The metering circuit 1 of FIG. 1 is constituted by a photodiode PD1, an operational amplifier A1 and a logarithmic compression diode D1 shown in FIG. 2. A constant voltage source E1 is for providing a predetermined bias voltage. The metering circuits 2, 3 and 4 of FIG. 1 are similar to the circuit 1 and are not shown in FIG. 2. The metering circuit 5 of FIG. 1 is constituted by a photodiode PD5, an operational amplifier A5 and a logarithmic compression diode D5. The output of each of amplifiers A1–A5 is connected to one input of each of comparators 6–10 through a level shift circuit constituted by resistors RA-RE (resistors RB-RD being omitted) and constant current sources $I_A$-$I_E$ (constant current sources $I_B$-$I_D$ being omitted). The stop-down metering memory circuit 12 of FIG. 1 is constituted by an operational amplifier A11 and a memory capacitor C1. The operation of the stop-down metering memory circuit 12 is such that when the stop-down memory switch SW1 is in its ON position, the operational amplifier A11 operates as a follower amplifier and keeps the charging voltage of the memory capacitor C1 always equal to the output of the operational amplifier A5 and, when the switch SW1 becomes open, the output impedance of the operational amplifier A11 becomes infinite and the output voltage of the operational amplifier A11 just before the switch SW1 becomes open is maintained as the charging voltage of the memory capacitor C1.

The operation circuit 13 of FIG. 1 is constituted by an operational amplifier A12, a diode D6, a constant current source $I_1$, a resistor R2, an operational amplifier A13, a transistor Q1 and a resistor R1. The temperature fluctuation term by the reverse direction saturation characteristic of the logarithmic compression diode D5 of the metering circuit is corrected by the operational amplifier A12, the diode D6 and the constant current source $I_1$. The output of the operation circuit 13 of FIG. 1 corresponds to the output voltage of the collector of the transistor Q1 of FIG. 2. The time logarithmic compression circuit 15 of FIG. 1 is constituted by a voltage source E2 having a particular temperature coefficient for temperature compensation, a time logarithmic compression voltage producing diode D7, an integrating capacitor C2 and an integration start control transistor Q2. When the integration of the capacitor C2 is started by the transistor Q2 being rendered non-conductive, the charging voltage of the capacitor C2 assumes a value proportional to the logarithm of the lapse time. The signal change-over circuit 16 of FIG. 1 is constituted by AND gates G1, G2, an OR gate G3 and an inverter $INV_1$.

The delay circuit 19 of FIG. 1 is constituted by a transistor Q3, an integrating capacitor C3, an integrating resistor R3, a comparator A15 and reference voltage setting resistors $Rf_1$, $Rf_2$.

The TTL flash output control circuit 18 of FIG. 1 is constituted by a photodiode PD6, a logarithmic compression diode D8, an operational amplifier A16 and a constant voltage source E4. As previously described, the photodiode PD6 meters the reflected light from the film surface, and the constant voltage source E4 is for providing a predetermined reference bias voltage to the circuit. The TTL flash output control operation circuit 17 of FIG. 1 is constituted by transistors Q4, Q5, an integrating capacitor C4, a comparator A18 and a constant voltage source E3. The phase shift circuit 20 of FIG. 1 is constituted by resistors R4, R5, a capacitor C5 and an operational amplifier A17.

The open metering memory circuit 22 of FIG. 1 is constituted by an operational amplifier A19 and a memory capacitor C6. Before the camera is released, the switch SW4 is in its ON position and there is no sharp change in the output of the metering amplifier A5 and therefore, the operational amplifier A17 of the phase shift circuit operates as a follower amplifier and thus, the output voltage of the operational amplifier A19, namely, the charging voltage of the memory capacitor C6, becomes equal to the output voltage of the operational amplifier A5 reduced by a constant voltage by a diode D20 and a constant current source $I_{10}$. The temperature characteristic by the reverse direction saturation voltage of the diode D5 is corrected by the diode D20 and the constant current source $I_{10}$. When the open memory switch SW4 is opened immediately before the lens is stopped down, the output impedance of the operational amplifier becomes infinite and therefore, the metering value during the opening of the diaphragm of the lens is held in the memory capacitor C6 until the switch SW4 is again closed.

The program signal producing circuit 23 of FIG. 1 is constituted by resistors R6, R7, R8, transistors Q6, Q7, operational amplifiers A20, A21 and a constant current source $I_2$. The level setting changeover circuit 24 of FIG. 1 is constituted by a multi-input change-over operational amplifier A22, constant current sources $I_3$-$I_6$, resistors R9-R12, a diode D9, an operational amplifier A23, a resistor A13, an operational amplifier A24, transistors Q8, Q9, Q10, Q11 and a resistor R14. The output of the operational amplifier A22 is put out by selecting one of five kinds of (+) input side signals by the selection signal from the output port P9 (which comprises a plurality of control lines) of the microcomputer. More specifically, the operational amplifier A22 selects and puts out one of the reference level for A/D-converting the metering value by the constant current source $I_3$, the resistor R9 and the diode D9, the reference level for the shutter control during the aperture priority mode by the constant current source $I_4$ and the resistor R10, the aperture control reference level during the shutter priority mode by the constant current source $I_5$ and the resistor R11, the reference level for TTL flash output control by the constant current source $I_6$ and the resistor R12, and the output signal of the transistor Q7 for the aperture control during the program mode. The circuit of operational amplifiers A23 and A24 constitutes a circuit for adding the output voltage of the D/A converting circuit 25 produced in resistor R15 to the output of the operational amplifier A22. The reason why the level setting circuit 24 sets a different level depending on the exposure control mode is that in transmitting the output of the D/A 25 to a different operational amplifier through a different transmission circuit depending on each mode, the sum of the driving voltages of the semiconductor elements in each transmission circuit differs.

The matching in analog operation is effected by amplifying or reducing the D/A-converted voltage produced in the resistor R15 by the ratio between the resistors R13 and R14. A voltage-current converting circuit is constituted by an operational amplifier A24 and transistors Q9, Q11, and the current of a value obtained by dividing the value of the voltage produced in the resistor R15 by the resistance value of the resistor R14 is the collector current of the transistor Q9. A transistor Q8 having the same characteristic as that of the transistor Q9 has its base and emitter commonly connected to the transistor Q9 and therefore, a predetermined collector current conforming to the base-emitter junction area ratio of the transistor Q8 and Q9 is produced at the collector of the transistor Q8, and by flowing the current to a resistor having any desired reference voltage point, the predetermined quantized voltage of the D/A converting circuit can be converted into a predetermined voltage for any desired reference voltage point. In the circuit of FIG. 2, the (+) input side of the operational amplifier A23 is the reference voltage point, and thus the predetermined quantized D/A-converted voltage produced in the resistor R13 is added to the reference input voltage of the operational amplifier A23. As the condition for providing a predetermined current ratio by the circuit provided by the transistors Q8 and Q9, it is necessary that the collector voltages of the transistors Q8 and Q9 be equal to each other, and if the collector voltages of these transistors differ from each other, the collector current ratio of these transistors will differ due to the base width modulation effect and the stability of the circuit against the fluctuation or the like of the source voltage will suffer. Transistors Q10 and Q11 act to compensate for the fluctuation of the circuit characteristic caused by this base width modulation effect. The collector voltage of the transistor Q8 is at the same potential as the (+) side input of the operational amplifier A23, the base of the transistor Q10 is connected to the (+) side input point of the operational amplifier A23, and the base-emitter voltages of the transistors Q10 and Q11 are substantially the same voltage and accordingly, the collector voltages of the transistors Q8 and Q9 are equal to each other. Accordingly, the ratio between the collector currents of the transistors Q8 and Q9 is constant independently of the change-over of the (+) side reference input voltage of the operational amplifier A23 or the fluctuation of the source voltage (B + point) and the operation of the circuit becomes stable.

The D/A converting circuit 25 of FIG. 1 is constituted by transistors Q12–Q14, resistors R15–R20, diodes D10–D12 and constant current sources $I_7$–$I_9$. An R-2R type resistance ladder circuit is constituted by the resistors R15, R16, R17, R18, R19 and R20, and the resistance values of the resistors R15, R17, ... are 2R and the resistance values of the resistors R16, R18, R19, R20 are R. The values of the currents produced by the constant current sources $I_7$, $I_8$, $I_9$ are equal to one another. The transistors Q12, Q13, Q14 are connected to the output port P10 of the microcomputer of FIG. 1, and the ON and OFF states of each of these transistors are controlled by the microcomputer 11 independently of each other. The diodes D10, D11, D12 are for changing over only the corresponding current when the transistors Q12, Q13, Q14 have been rendered conductive, whereby production of the D/A-converted voltage across the resistor R15 becomes possible. The variation in the voltage produced across the resistor R15 by the transistor Q12 being rendered conductive or non-conductive corresponds to the most significant bit (hereinafter referred to as the MSB). In contrast, the variation in the voltage of the resistor R15 caused by the transistor Q13 being rendered conductive or non-conductive is one half. The variation in the voltage of the resistor R15 caused by the transistor Q14 being rendered conductive or non-conductive corresponds to the least significant bit (hereinafter referred to as the LSB). Accordingly, a D/A-converted voltage conforming to the combination of ON and OFF of the transistors is obtained, and the conversion bit number thereof is determined by the number of stages of the resistors, constant current sources and transistors for the change-over of the current. In normal cameras, the conversion accuracy of 6–8 bits is sufficient.

The flashlight photography mode discriminating circuit 26 of FIG. 1 is constituted by a transistor Q15, resistors R21, R22 and a light-emitting diode LED1. When the flash unit is not mounted to the camera or when the main switch of the flash unit is open even if the flash unit is mounted to the camera, no current flows into the hot shoe contact EF2 and therefore, the transistor Q15 is non-conductive. When the flash unit is mounted to the camera and the main switch thereof is closed, a current flows from the flash unit into the hot shoe contact EF2, whereby the transistor Q15 becomes conductive. This current is a minute current when the charging voltage of the capacitor for the flashlight emission of the flash unit is not at a predetermined level, and for this current value, the light emission of the light-emitting diode LED1 does not take place, but only the transistor Q15 is rendered conductive and, when the charging voltage of the capacitor reaches a predetermined level which permits flashlight emission, a great current capable of turning on the light-emitting diode LED1 flows in to cause the LED1 to emit light, which can be visually confirmed within the finder of the camera and thus, it can be known that flashlight emission is possible. Even in this state, the transistor Q15 is of course rendered conductive. The ON or OFF state of the transistor Q15 is transmitted to the input port P13 of the microcomputer 11 of FIG. 1, and the operation of forcibly changing over the photography mode of the camera to the flashlight photography mode takes place. Although the current flowing in from the flash unit through the hot shoe contact EF2 has been described as two kinds of currents, i.e., the minute current and the current capable of turning on the LED, this need not be restricted thereto, but said current may be zero when the charging current of the capacitor for flashlight emission is a voltage incapable of effecting light emission, and a current capable of turning on the light-emitting diode LED1 may be flowed in when the capacitor has been charged to the predetermined voltage capable of effecting light emission.

Figure 3:
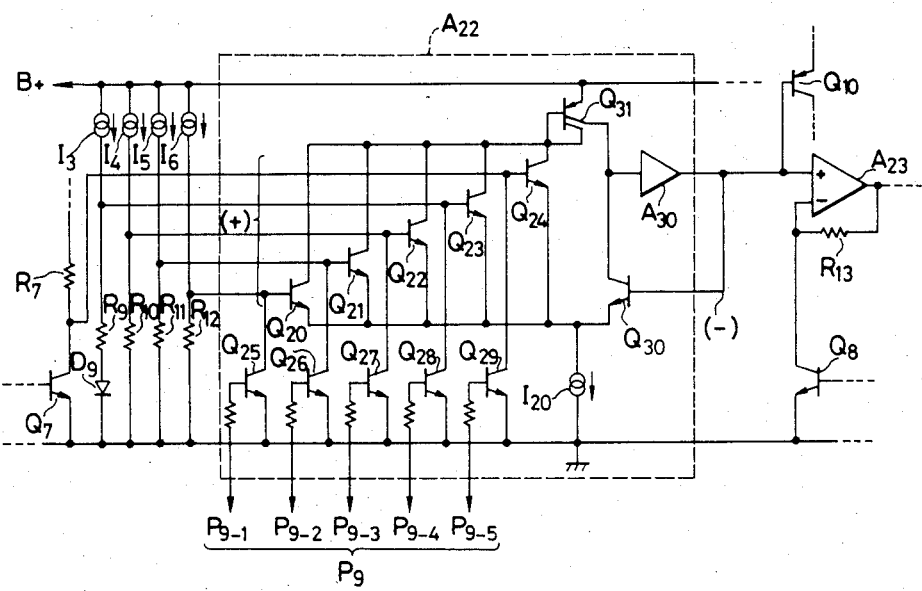
FIG. 3 is a circuit diagram showing a specific example of the construction of a portion of FIG. 2.

A specific example of the construction of the multi-input change-over operational amplifier A22 of FIG. 2 is shown in FIG. 3. In FIG. 3, circuit elements similar to those of FIG. 2 are given similar reference characters. In FIG. 3, the portion encircled by a dotted line is the multi-input change-over operational amplifier A22. Transistors Q25, Q27, Q28 and Q29 are connected to the output port P9 (which actually comprises five output ports P9-1, P9-2, P9-3, P9-4 and P9-5) of the microcomputer 11 of FIG. 1 and any only any one of these transistors is rendered non-conductive and the other transistors are rendered conductive. The collectors of these transistors Q25–Q29 are connected to the bases of the corresponding transistors Q20–Q24, and these transistors Q20–Q24 constitute a differential pair with a transistor Q30. Actually, a transistor corresponding to one of the transistors Q25–Q29 which is rendered non-conductive forms a differential pair with the transistor Q30. A follower amplifier is constituted by the transistor forming the selected differential pair, the transistor Q30, a constant current source $I_{20}$, a transistor Q31 and a power amplifier portion A30. The base of the transistor Q30 is connected to the output of the power amplifier portion A30 which is the output of the operational amplifier A22 to operate as a follower amplifier. For example, when the transistor Q25 is in its OFF state, the transistor Q20 is the transistor forming the differential pair, and the voltage produced in the resistor R12 is put out to the power amplifier portion A30, and when the transistor Q26 is in its OFF state, the transistor Q21 is the transistor forming the differential pair, and the voltage produced in the resistor R11 is put out to the power amplifier portion A30, and thereafter, similar control is effected, whereby a selected one of five (+) input side voltages becomes the output voltage of the operational amplifier A22.

Figure 4:
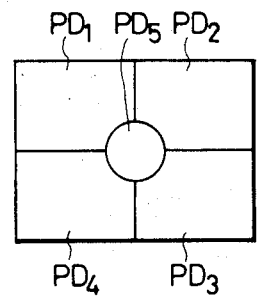
FIG. 4 is an illustration showing the metering areas on the picture plane of metering elements.

FIG. 4 is a pattern diagram showing which portion of the photographic picture plane each of the photodiodes PD1–PD5 of the multi-metering circuit of FIG. 2 is metering. As shown, the central portion of the picture plane is being metered by the photodiode PD5 and the marginal portions of the picture plane are being metered by the photodiodes PD1–PD4. As shown, the metering areas of the photodiodes PD1–PD5 are not equal to one another, and to eliminate the metering error resulting from the irregularity of the characteristics of the photodiodes, the irregularity of the offset of the metering amplifiers A1–A5, the error of arrangement of the photodiodes relative to the metering optical system and the vignetting of the photo-taking lens, the metering output of each photodiode is corrected by the aforementioned level shift circuits comprising resistors RA–RE and constant current sources IA–IE. Four of five level shift circuits are adjustable by adjusting the resistance values or the current values of the constant current sources, and are adjusted so that for a light source of uniform brightness, the input voltages of comparators A6–A10 are equal to one another. This adjustment is effected because it is necessary for the multi-metering to properly meter the brightness of each portion of the picture plane. Usually, the value of the central portion of the picture plane has relatively small irregularity relative to the arrangement error and vignetting and therefore, it is advisable to fix the level shift circuit for the output of A5 of the central metering portion and adjust the outputs of the four marginal metering portions relative to this value.

Now, the operation of the arrangement of FIGS. 1 and 2 will hereinafter be described.

(1) Operation during the aperture priority mode (1)-1 Operation before the release It is to be understood that the unshown power source circuit of the camera is closed. The diaphragm of the lens is held in its open state. Since the fact that the stop-down memory switch SW1 and the open memory switch SW4 are closed is input to the microcomputer 11 the microcomputer 11 discriminates that the state is that before the release. In order that the microcomputer 11 may A/D-convert the metering value and introduce the data thereinto, the multi-input change-over operational amplifier A22 is controlled by the microcomputer 11 and puts out a voltage produced in the diode D9 and the resistor R9 for A/D level setting, and the voltage by the D/A circuit 25 is added to that voltage and is put out from the operational amplifier A23 and applied to the (+) side common input of comparators 6–10. The A/D conversion is effected in the successive comparison system for each metering output. The successive comparison system, as is well-known, is such that for example, when the output of A1 is to be A/D-converted, the D/A converting circuit 25 is controlled from the MSB to the less significant bits in succession by the output port P10 of the microcomputer and the then variation in the output of the comparator A6 is detected by the input port P1 of the microcomputer and from the output condition of the port P10 during this detection, the A/D-converted value is obtained and stored in the address of the RAM of the microcomputer 11 which should store the metering value by A1. That is, the A/D-converted value corresponds to the output of the port P10. The signal imparted to the input ports P2–P5 when the conversion of the output of A1 is being effected is not received by the microcomputer 11 and therefore is neglected. Thereafter, A/D conversion is effected to A2–A5 in succession and the metering value is stored in a predetermined address of the RAM. The voltage produced by the resistor R9 and the diode D9 renders the relation between the metering value and its A/D-converted value into a predetermined value. When all the metering values of A1–A5 are obtained, the operation of multimetering and the operation for display are effected thereby. Even if there are different brightness distributions in various portions of the object to be photographed due to information such as the difference in the absolute value of the brightness between various portions and the difference in brightness between the various portions, a particular simplified imaginary brightness value (BVM) which provides proper exposure is calculated. BVM is the brightness value by apex display. The metering value of each portion when A/D-converted is the value during the opening of the diaphragm of the lens and therefore, if the open aperture value is $AV_0$ in terms of the apex value, the value of $(BV-AV_0)$ is input to the microcomputer 11 by A/D conversion, but since, as shown in FIG. 1, $AV_0$ is input to the microcomputer by the setting device 31 for $AV_0$ which is the open aperture value of the lens, the brightness value BV itself in each metering portion is calculated thereby. Since the camera is in the aperture priority mode, the aperture values set when the camera is released is determined by the aperture preset ring of the lens, and as regards the value thereof, the value of $(AV-AV_0)$ in terms of the apex display is input as the step difference signal from the open aperture value to the microcomputer 11. Av is the apex value of the aperture value itself determined by the preset ring. Likewise, the film speed value, i.e., the SV value in terms of the apex display, is input to the microcomputer 11 by the setting device 29 and the fact that the exposure control mode is the aperture priority mode is input to the microcomputer 11 by the mode setting device 33. Accordingly, the following display operation is effected:

$$TVA = BVM + SV - AV \quad (1)$$

where TVA is the apex value of the shutter time value which is the predetermined control value, and TVA is put out to the display driving circuit 27 of FIG. 1 from the microcomputer 11 and therefore, the then controlled shutter time value is displayed by the display device 28. Also, exposure control is effected by momentary stop-down metering and therefore effected by the output of the metering circuit A5 in the central portion and thus, if the brightness value of the central portion is BV(A5), the value $\alpha$ of the difference between BV(A5) and BVM is obtained as follows:

$$\alpha = BVM - BV(a5) \quad (2)$$

(2) A signal comprising the value of $\alpha$ having the SV value added thereto, i.e., the value of $$(SV + \alpha) \quad (3)$$

is operated and the value shown in formula (3) above is stored in a predetermined address of the RAM.

The diaphragm control comparator 21 is controlled by the output port P8 of the microcomputer 11 so as to be inoperative in the aperture priority mode and therefore, it is inoperative before and after the release and accordingly, no electric power is supplied to the diaphragm control magnet Mg2 and electrical aperture control is not effected. When the aforementioned A/D conversion operation is being effected, the D/A-converted output voltage of the operational amplifier A23 is transmitted to the operational amplifier A13, the comparator 21 and the emitter of the transistor Q5 of the TTC flash output control operation circuit, but it acts in no way and therefore, there is no problem. The A/D conversion operation is periodically effected to always refresh the metering data.

(1)-2 Operation after the release

When the release button, not shown, of the camera is depressed to start the release mechanism, stop-down of the lens is initiated, but just before the stop-down of the lens is initiated, the open memory switch SW4 becomes open and its signal is transmitted to the microcomputer 11 through the input port P12 thereof, and the microcomputer 11 thereby discriminates that the camera has been released, and interrupts the periodical operation of A/D conversion. If the OFF signal of the open memory switch SW4 is transmitted in the course of the A/D conversion operation, stopping of the A/D conversion operation is preferentially effected and at that time, control is effected by the old metering value before the data is refreshed, but since the data refreshing operation is effected at a high speed and usually the brightness distribution of photographing is not sharply varied, there is no problem in controlling by the old metering value. The stop-down of the lens is then initiated, but in this state, the reflecting mirror for directing light to the metering photodiodes PD1-PD5 provided in the finder portion is still in the optical path of the photo-taking lens. The quantity of light decreasing as the lens is stopped down is metered by the photodiode PD5 for metering the central portion and the voltage of the memory capacitor C1 follows the output voltage of A5 through the operational amplifier A11. When the aperture value of the lens is controlled to an aperture value determined by the position of the preset ring, the reflecting mirror retracts from the optical path of the lens, but just before this, the stop-down memory switch SW1 becomes open and the output impedance of the operational amplifier A11 becomes infinite and therefore, the intensity of the light then passed through the diaphragm aperture, i.e., the value of $(BV(A5) - AV)$ . . . (4), is stored in the memory capacitor C1. When the stop-down memory switch SW1 becomes open, it is input to the microcomputer 11 through the input port P11 thereof and thereby, the microcomputer discriminates that the stop-down memory has been completed, and the D/A control output port P10 of the microcomputer 11 changes to an output condition corresponding to the digital value of formula (3) stored in the RAM, and the digital value of formula (3) is converted into an analog value by the D/A converting circuit 25. Such state of the output port P10 is maintained until exposure is completed, that is, until the stop-down memory switch SW1 is again closed. Also, the output of the multi-input change-over amplifier A22 is changed over by the output of the output port P9 so as to produce the voltage of the resistor R10 for setting the aperture priority mode exposure level. Simultaneously therewith, the shutter switch SW2 becomes closed to effect the supply of electric power to the shutter control electromagnet Mg1 to thereby effect the operation of holding the rearward shutter curtain. Since the aperture priority mode is selected by the mode setting device 33, the output port P6 is maintained at an H output, and the output of a NAND gate G2 is controlled to L and therefore, the output state of the output port P7 is neglected and the output of G3 is determined by the state of the output of the comparator A14. A voltage comprising the information voltage $(SV + \alpha)$ put out from the operational amplifier A23 and having the aperture priority mode level set voltage added thereto is put out to the operational amplifier A13 and therefore, the operation value produced across the resistor R1 is an output voltage having the information of the sum of the value of formula (4) and the value of formula (3).

The information voltage produced across the resistor may be shown in an apex value as follows:

$$(BV(A5) - AV) + (SV + \alpha) = BVM + SV - AV = TVA' \quad (5)$$

and by controlling the shutter time by the value of TVA', the proper exposure by multi-metering can be obtained. When the reflecting mirror completes its retraction, movement of the rearward shutter curtain is started and the trigger switch SW3 is opened at a predetermined timing and the transistor Q2 is rendered non-conductive and therefore, the capacitor C2 begins to be charged by the constant voltage source E2 through the time logarithmic compression diode D7. By the action of the time logarithmic compression diode D7, the capacitor C2 produces a voltage proportional to the logarithm of time and that voltage is compared with the information voltage of $TVA' = (BVM + SV - AV)$ produced across the resistor R1, by the comparator 14, and after the lapse of time corresponding to TVA' from the turn-off of the transistor Q2, the output of A14 changes from H to L output, whereby the supply of electric power to the shutter control electromagnet Mg1 is cut off and the retention of the rearward shutter curtain is released and thus, the shutter is closed and the exposure operation is completed. When the rearward shutter curtain is closed, the reflecting mirror is lowered and the switches SW1, SW4 and SW3 are closed while the switch SW2 is opened and the operation mentioned under item (1)-1 above is again repeated. The voltage relation for providing the time control relation corresponding to the aforementioned TVA' is regulated by the voltage produced in the resistor R10 selected by A22.

(2) Operation during the shutter priority mode

At this time, the shutter priority mode is selected by the exposure mode setting device 33. The preset aperture ring of the lens is set to a minimum aperture to maximize the aperture control range.

Also, since the camera is in the shutter priority mode, the intended shutter time value TVM is selected by the shutter time setting device 32 and is input to the microcomputer 11.

(2)-1 Operation before the release

A/D conversion is effected in the same manner as that described under item (1)-1 above. The calculation of the aforementioned BVM by multi-metering is also effected in a similar manner. The display operation is effected in the following manner. The value of $$BVM + SV - TVM = AVS \quad (6)$$

is calculated.

The aperture step difference information from the open aperture of the lens to the minimum aperture by the preset aperture ring is input to the microcomputer 11 by the setting device 30 and the open aperture value $AV_0$ is input to the microcomputer 11 by the setting device 31, and the value AVM of the minimum aperture diameter is calculated by the microcomputer.

AVS of equation (6) is the apex value of the controlled aperture value when the proper exposure corresponding to the selected shutter time value TVM is provided. The aperture control range can only be secured between $AV_0$ to AVM.

When $AV_0 < AVS < AVM$, electrical control of the diaphragm is possible and at that time, the value of AVS of equation (6), i.e., the controlled aperture value, is put out from the output port P15 of the microcomputer 11 and a predetermined aperture control value is displayed by the display device 28 through the display driving circuit 27.

When $AVS < AV_0$, the aperture values brighter than $AV_0$ cannot be controlled and therefore, the aperture control value is $AV_0$. As will later be described, at this time, the same exposure control as that when the aperture is set to $AV_0$ is effected and therefore, the operation of $$BVM + SV - AV_0 = TV(AV_0) \quad (7)$$

is effected. The then relation with TVM is $TV(AV_0) < TVM$, that is, the shutter control for a longer time than the set shutter time is effected.

Also, when AVS > AVM, the aperture control of apertures smaller than AVM cannot be effected and therefore, the aperture control value is AVM. As will later be described, at this time, the same exposure control as that during the aperture priority mode when the aperture is set to AVM is effected and therefore, the operation of $$BVM + SV - AVM = TV(AVM) \quad (8)$$

is effected. The then relation with TVM is $TV(AVM) > TVM$, that is, the shutter control at a higher speed than the set shutter time is effected. When the operation of equation (7) or (8) has been effected, the value of $TV(AV_0)$ or $TV(AVM)$ is put out from the output port P15 of the microcomputer 11 and a predetermined shutter control value is displayed by the display device 28 through the display driving circuit 27.

In the microcomputer 11, as in item (1)-1 above, the value of formula (3) is operated and stored in the predetermined address of RAM and $TVM - (SV + \alpha) \ldots (9)$ is operated and the value thereof is also stored in the predetermined address of RAM.

(2)-2 Operation after the release

As previously described, when the release mechanism is started, the open memory switch SW4 becomes open just before stop-down of the lens is started, whereby the A/D conversion operation by the microcomputer 11 is interrupted, and the D/A conversion control output port P10 produces a control output for putting out the value shown by formula (9) above and it is held until the aperture control sequence is terminated, that is, until the stop-down memory switch SW1 becomes open. Also, the multi-input change-over operational amplifier A22 puts out the voltage produced in the resistor R11 for setting the shutter priority mode exposure level with such voltage being changed over by the control output of the output port P9 of the microcomputer 11, and it is held until the aperture control sequence is terminated, that is, until the switch SW1 becomes open. With a predetermined time delay after the switch SW4 is opened for a time during which the change-over of A22 and the setting of the D/A converting circuit are completed and the output of A23 is expected to be stable, a control signal is produced at the output port P8 of the microcomputer 11 and the diaphragm control comparator 21 is permitted to operate and starts its comparison operation. The delay time from after the switch SW4 has become open until the output of A23 becomes stable and the operation of the diaphragm control comparator 21 is permitted is much shorter than the time until the diaphragm begins to move and therefore, no aperture control error results therefrom.

As described under item (1) above, stop-down of the lens is started and the metering value thereby is obtained from the output of A5. As the lens is stopped down, the output voltage of A17 is reduced. The output of the phase shift circuit A17 is reduced below the input voltage of A17 correspondingly to the aperture change speed. The amount of reduction corresponds to the aperture change speed dAV/dt. Accordingly, the information value of the output voltage of A17 is $$(BV(A_5)-AV)-G(dAV/dt) \qquad (10),$$

where G is a constant determined by the resistors R4, R5 and the capacitor C5. The information value of the output of A23 is shown by formula (9).

Since TVM−(SV+α)... (9), the information values of formulas (10) and (9) are compared with each other by A18 and when $$(BV(A_5)-AV)-G(dAV/dt)=TVM-(SV+\alpha) \qquad (11),$$

the output of the comparator 21 changes from L to H and electric power is supplied to the diaphragm control magnet Mg2, and a diaphragm restraining mechanism, not shown, operates to effect the control of the diaphragm. If the value of AV when equation (11) is established is AVS′, $$AVS' = BV(A_5) + SV + \alpha - TVM - G\frac{dAV}{dt} = \qquad (12)$$

$$BVM + SV - TVM - G\frac{dAV}{dt}.$$

The term G(dAV/dt) of equation (12) means that the aperture control signal is produced earlier by G(dAV/dt) than the original aperture value. From after electric power has been supplied to the diaphragm control magnet Mg2 until the diaphragm is actually controlled, there is a predetermined delay time attributable to the mechanism and an error of the aperture control value results therefrom. Accordingly, G is chosen so that the term G(dAV/dt) is eliminated in the final aperture control value. Thus, if the aperture control value is AVS″, $$AVS''=BVM+SV-TVM \qquad (13).$$

When the lens diaphragm control is completed, as described under item (1)-2 above, the reflecting mirror retracts, but just before this, the stop-down memory switch SW1 becomes open and therefore, the value of $$(BV(A_5)-AVS'') \qquad (14)$$

is stored in the memory capacitor C1. When the stop-down memory switch SW1 becomes open, as described under item (1)-2 above, the D/A conversion control output port P10 puts out a control output for putting out the value indicated by the aforementioned formula (3), and the output of the multi-input change-over amplifier A22 is changed over by the control output of the output port P9 and puts out a voltage produced in the resistor R10 for setting the aperture priority mode exposure level, and it is held until the exposure is completed, that is, until the stop-down memory switch SW1 is again closed. Thereafter, the same control as that described under item (1)-2 above is effected with the exception that the value of AV shown by formula (5) becomes the electrically controlled AVS″ shown by equation (13). Accordingly, from formula (5), the controlled shutter time value is $$TVA''=BVM+SV-31\ AVS'' \qquad (15)$$

and from formula (14) and equation (15), $$TVA''=TVM$$

and shutter control is effected at the set shutter time value TVM and thus, the exposure control is the shutter priority mode exposure control.

What has been described above is the operation when AV₀<AVS<AVM which has been described under item (2)-1 above.

As described under item (2)-1, the operation when AVS<AV₀ or AVS>AVM is not the shutter priority mode. In such a state, equation (13) is not established but $$AVS''\neq BVM+SV-TVM \qquad (16)$$

and TVA″≠TVM.

However, in the sequence wherein the shutter is controlled, the value of AV of the control formula which satisfies the proper exposure shown by formula (5) under item (1)-2 is only AV₀ or AVM, and as long as it is permitted in the control range of the shutter, TVA″≠TVM but proper exposure can be obtained. The then controlled shutter time value is shown by equation (7) or (8). When shutter control is completed, the reflecting mirror lowers and the switches SW1, SW3 and SW4 become closed and the switch SW2 becomes open and the operation described under item (2)-1 above is again effected.

To obtain the control of AVS″ of the aforementioned equation (13), the voltage operation level is regulated by the voltage produced in the resistor R11 selected by A22.

(3) Operation during the program control mode

At this time, the fact that the program control mode is selected by the mode setting device 33 is discriminated by the microcomputer 11. The preset aperture ring of the lens is set to a minimum aperture to maximize the aperture control range.

(3)-1 Operation before the release

A/D conversion is effected in the same manner as that described under item (1)-1 above. Also, the aforementioned calculation of BVM by multi-metering is likewise effected. Display operation is effected in the following manner. By the calculated values of BVM and SV, the values of $$\tfrac{1}{2}(BVM+SV)-\gamma=AVP \qquad (17)$$

$$\tfrac{1}{2}(BVM+SV)+\gamma=TVP \qquad (18)$$

are calculated by the microcomputer 11.

AVP is a predetermined value to which the diaphragm is controlled, and TVP is a predetermined value to which the shutter is controlled. The term ½ of equations (17) and (18) is a term which shows the rates of variation in AVP and TVP for the variation in BVM when the program control is effected. γ of equations (17) and (18) is a term which sets the values of AVP and TVP to predetermined values for the predetermined value of (BVM+SV). The range in which the diaphragm control is permitted is limited to AV₀−AVM.

Accordingly, whether AVP calculated by the use of equation (17) is $$ti\ AV_0 \leqq AVP \leqq AVM \tag{19}$$

is discriminated by the microcomputer 11 and, when equation (19) is satisfied, the value of TVP calculated by the use of equation (18), i.e., the shutter time value in the program area, is put out from the output port P15 of the microcomputer 11 and it is displayed by the display device 28 through the display driving circuit 27.

When equation (19) is not satisfied, that is, when $AVP < AV_0$ or $AVP > AVM$ is discriminated, the microcomputer 11 effects the following operation.

When $AVP < AV_0$, the operation of $TV(AV_0)$ by equation (7) mentioned under item (2)-1 above is effected.

When $AVP > AVM$, the operation of $TV(AVM)$ by equation (8) mentioned under item (2)-1 above is effected. The value of $TV(AV_0)$ or $TV(AVM)$ is put out from the output port P15 of the microcomputer 11 and it is displayed by the display device 28 through the display driving circuit 27. In the microcomputer 11, as described under item (1)-1 above, the value of formula (3) is operated and stored in a predetermined address of RAM and the value of $$(AV_0-(SV+\alpha)) \tag{20}$$

is operated and stored in a predetermined address of RAM. $\alpha$ is identical to that of equation (2). (3)-2 Operation after the release As previously described, when the release mechanism is started, the open memory switch SW4 becomes open just before stop-down of the lens is initiated, and the output port P10 puts out a control output to put out the information value shown by formula (20) above, and it is held until the stop-down memory switch SW1 becomes open. Also, in order to effect the program control exposure, the multi-input change-over operational amplifier A22 puts out a program signal voltage produced in the collector of the transistor Q7 of the program signal producing circuit with such voltage being changed over by the control output of the output port P9 of the microcomputer 11, and it is held until the diaphragm control sequence is terminated. As described under item (2)-2 above, after the change-over of A22 and the setting of the D/A converting circuit have been completed and the output of A23 has become stable, a control signal is produced at the output port P8 of the microcomputer 11 and the diaphragm control comparator 21 is permitted to operate and initiates its comparison operation. By the opening of the open memory switch SW4, the metering value during the open aperture is stored in the memory capacitor C6. As previously mentioned, the information value of the (+) side input voltage of the operational amplifier A17 before the release is $(BV(A_5)-AV_0)$ and the diaphragm of the lens does not vary and therefore, the input voltage of the operational amplifier A17 does not vary with time, and the operational amplifier A17 operates as a follower circuit and thus, the information value of the output voltage of the amplifier A17 is $(BV(A_5)-AV_0)$, and this value is stored as the memory voltage of the memory capacitor C6.

By the operation of a voltage-current converting circuit provided by the operational amplifier A21 and the transistor Q6, the collector voltage of the transistor Q6 is always held at the voltage produced in the resistor R8 by the constant current source $I_2$ and therefore, the collector current value of the transistor Q6 is a value obtained by dividing the difference between the output voltage of the amplifier A17 and the voltage produced in the resistor R8 by the resistance value of the resistor R6. Since the transistor Q7 has the same characteristic as that of the transistor Q6, the collector current of the transistor Q7 is equal to the collector current of the transistor Q6. The resistance value of the resistor R7 is equal to the resistance value of the resistor R6. Accordingly, the output voltage of the operational amplifier A20 before the release is equal to the output voltage of the amplifier A17 and therefore, the collector voltage of the transistor Q7 is equal to the voltage produced in the resistor R8 and is constant irrespective of the magnitude of the output voltage of the amplifier A17.

When the camera is released, a voltage is stored in the memory capacitor C6 and, as the diaphragm of the lens is stopped down, the output voltage of the amplifier A17 is reduced, and the voltage of the transistor Q7 rises by that amount of reduction of the voltage. Accordingly, a voltage corresponding to the step difference when the lens has been stopped down from its open aperture value is produced as the voltage of the transistor Q7. Accordingly, the information value of the collector voltage of the transistor Q7 is $$(AV-AV_0)+G(dAV/dt)+2\gamma \tag{21},$$

where $\gamma$ is $\gamma$ of equations (17) and (18) and the value of $2\gamma$ is set by the voltage produced in the resistor R8. The output of the multi-input change-over operational amplifier A22 is adapted to put out the voltage produced at the collector of the transistor Q7 by the output port P9 of the microcomputer 11 and therefore, the information value of the output voltage of the amplifier A22 is the same as formula (21). The D/A converting circuit is controlled by the output port P10 to put out the value of formula (20) stored in the RAM of the microcomputer 11 by the opening of the open memory switch SW4 and therefore, the information value of the output voltage of the operational amplifier A23 is the value of formulas (20) and (21) added together. Accordingly, the value of $$AV+G(dAV/dt)+2\gamma-(SV+\alpha) \tag{22}$$

is put out from the operational amplifier A23.

The diaphragm control comparator 21 effects the comparison of the value of formula (10) of the output of A17 with the value of formula (22). Accordingly, when $$(BV(A_5)-AV)-G\frac{dAV}{dt} = \tag{23}$$

$$AV+G\frac{dAV}{dt}+2\gamma-(SV+\alpha),$$

the output of the comparator 21 changes from L to H and electric power is supplied to the diaphragm control magnet Mg2. If the value of AV when equation (23) is established is AVP′, $$AV=AVP'=\tfrac{1}{2}(BVM+SV)-\gamma-G(dAV/dt) \tag{24}.$$

The term $G(dAV/dt)$ of equation (24) is similar to that mentioned under item (2)-2 above. Accordingly, if the actual control value of the diaphragm is AVP″, from equation (24), $$AVP''=\tfrac{1}{2}(BVM+SV)-\gamma \qquad (25).$$

When the control of the diaphragm of the lens is completed, the reflecting mirror retracts as described under item (1)-2 above, but just before this, the stop-down memory switch SW1 becomes open and therefore, the value of $$(BV(A_5)-AVP'') \qquad (26)$$

is stored in the memory capacitor C1. As previously described, when the stop-down memory switch SW1 becomes open, the microcomputer 11 discriminates that the stop-down memory has been completed, and the digital value shown in formula (3) is put out to the D/A conversion control output port P10 and is converted into an analog value by the D/A converting circuit 25. Also, the output of the multi-input change-over amplifier A22 is changed over by the control output of the output port P9 and puts out the voltage produced in the resistor R10 for setting the aperture priority mode exposure level, and it is held until the exposure is completed, that is, until the stop-down memory switch SW1 is again closed. Thereafter, the same control as that described under item (1)-2 is effected and control is effected at the shutter time when the value of AV shown by equation (5) has become the electrically controlled $AVP''$ shown by equation (25). Accordingly, from equation (5), the controlled shutter time value $TVP''$ is $$TVP''=BVM+SV-AVP'' \qquad (27)$$

and from equations (27) and (25), $$TVP''=\tfrac{1}{2}(BVM+SV)+\gamma \qquad (28)$$

and the program control is effected.

What has been described above is the operation in the range which satisfies $AV_0 \leq AVP'' \leq AVM$.

The operation when $AVP''<AV_0$ or when $AVP''>AVM$ is not the program control. In such a state, the diaphragm is controlled to the value of $AV_0$ or AVM. However, in the sequence wherein the shutter is controlled, the value of AV of the control formula which provides the proper exposure shown by equation (5) mentioned under item (1)-2 is only $AV_0$ or AVM and, as long as it is permitted in the shutter control range, the shutter time varies for the variation in BVM while keeping the relation which provides proper exposure. The then controlled shutter time value is shown by equation (7) or (8). When the shutter control is completed, the reflecting mirror comes into the optical path and the switches SW1, SW3 and SW4 become closed and the switch SW2 becomes open and the operation mentioned under item (3)-1 above is again effected. In the program-controlled area, any combination of $AVP''$ and $TVP''$ can be obtained by changing the value of $\gamma$ shown in formula (21). That is, as previously described, the value of $\gamma$ is given by the voltage produced in the resistor R8 and therefore, if the resistor R8 is made into a variable resistor and is designed to be set as desired, the program control characteristic can be set as desired. Also, such a program control characteristic can be made variable even if the resistor R8 is not made into a variable resistor. It can be accomplished by introducing a $\gamma$ setting signal into the microcomputer 11 to thereby added a correction term to a formula showing the information value of the D/A conversion output during the diaphragm control sequence period shown by formula (20), and setting the correction term by the $\gamma$ setting signal.

In items (1), (2) and (3) above, it has been described that exposure control is not effected in the relation which satisfies the proper exposure by $BV(A_5)$ while the metering value by $BV(A_5)$ is used for exposure control in the momentary stop-down metering, but exposure control is effected in the relation which satisfies the proper exposure by imaginary BVM calculated by the operation of multi-metering. However, as a matter of course, in various cases of the brightness distribution of the photographic picture plane by multimetering, there is a case where exposure control which satisfies proper exposure is effected on the basis of the metering value $BV(A_5)$ of the central portion, and in such a case, proper exposure is obtained when the value of $\alpha$ shown in equation (2) is zero. By providing $\alpha=0$, BVM of each exposure control formula becomes $BV(A_5)$.

Where the nonmulti-metering mode, that is, the exposure control mode which satisfies proper exposure always on the basis of the metering value $BV(A_5)$ of the central portion, is provided to the camera, the selection signal of the nonmulti-metering mode is introduced into the microcomputer 11, whereby the microcomputer can discriminate it and forcibly hold $\alpha$ of equation (2) at zero.

(4) Operation during the manual exposure control mode

At this time, the fact that the manual exposure control mode is selected by the exposure mode setting device 33 is discriminated by the microcomputer 11. The shutter time TV and $(AV-AV_0)$ by the setting of the preset ring of the lens are set arbitrarily and the information values thereof are introduced into the microcomputer 11 by the setting devices 30 and 31.

Also, the manual exposure control mode is a mode for setting the exposure level arbitrarily and effecting photography and therefore, in this mode, multi-metering is not effected.

(4)-1 Operation before the release

At this time, how much the exposure at TV and AV values each set on the basis of the metering value by the output of the operational amplifier A5 deviates from the value of the relation formula which satisfies proper exposure is operated and displayed. Since this is the nonmulti-metering mode, A/D conversion of only the output of the amplifier A5 is effected and the value of $(BV(A_5)-AV_0)$ is input to the microcomputer 11. The A/D conversion operation is similar to what has been previously described, with the only exception that the A/D conversion operation of only the output is effected periodically.

When $(BV(A_5)-AV_0)$ is input to the microcomputer 11, the operation of $$\delta = (BV(A_5)-AV_0)-(AV-AV_0)+SV-TV = \qquad (29)$$
$$(BV(A_5)+SV)-(AV+TV)$$

is effected by the microcomputer 11. $\delta$ indicates the deviation value from the relation which satisfies proper exposure.

When $\delta=0$, the relation of proper exposure is satisfied, and when $\delta$ is of a positive value, overexposure is provided, and when $\delta$ is of a negative value, underexposure is provided. The value of $\delta$ of equation (29) is put out from the output port P16 to the display driving circuit 27 and is displayed by the display device 28. The storage into RAM for preparing for the operation after the release is not effected at all. (4)-2 Operation after the release In the manual control mode, the diaphragm control comparator 21 is rendered inoperative in all operation sequences by the output of the output port P8 of the microcomputer 11. Also, the output of the output port P6 of the microcomputer 11 is held at L and shutter control is not effected in all operation sequences. The camera is released and stop-down of the lens is initiated, but electrical control of the diaphragm is not effected and therefore, the aperture value by the aperture preset ring of the lens is provided. Just before the mirror retracts from the optical path, the stop-down memory switch SW1 is opened, whereby the signal thereof causes the time counting circuit to be reset by the counter circuit in the microcomputer 11 and the output port P7 puts out an H output. The shutter switch SW2 is closed as soon as the switch SW1 is opened and, since the output of the output port P7 is H, electric power is supplied to the shutter control electromagnet, which thus starts to hold the rearward shutter curtain. When the reflecting mirror finishes its retraction from the optical path, the forward shutter curtain starts to move and at the same time, the trigger switch SW3 is opened and the signal thereof is input to the microcomputer 11, and the time counting circuit of the microcomputer 11 starts time counting. When the time counting circuit completes the counting of the time corresponding to the TV value input by the shutter time setting device 32, the output port P7 changes from H to L, whereby the supply of electric power to the shutter control electromagnet Mg1 is stopped and the holding of the rearward shutter curtain is released and thus, the shutter is closed. By the shutter being closed, the reflecting mirror comes into the optical path and the switches SW1, SW3 and SW4 become closed and the switch SW2 becomes open, and the operation described under item (4)-1 above is again effected.

(5) Operation during the TTL flash output control mode by an electronic flash unit By a current flowing in from a flash unit, not shown, which is mounted on the hot shoe contact EF2, the transistor Q15 is rendered conductive, and the conductive state of the transistor Q15 is transmitted to the microcomputer 11, whereby the microcomputer 11 discriminates that the flash unit is in a condition capable of operating and thereby, the mode is automatically changed over to the flashlight photography mode. The automatic change-over operation is given preference relative to the exposure mode set by the mode setting device 33. According to the flashlight photography mode, the diaphragm control comparator A18 is held inoperative by the control output of the output port P8 of the microcomputer 11 during all camera control sequence periods irrespective of before or after the release of the camera. Accordingly, electrical control of the diaphragm is not effected even if the camera is set to the shutter priority mode or the program control mode. Also, when the control of the shutter becomes the flashlight photography mode, the output port P6 of the microcomputer 11 puts out an L output and that state is held during all camera control sequence periods and therefore, the output of the NAND gate G1 is also held at L. Accordingly, the shutter time is controlled not by the automatic exposure shutter time by the output of 14, but by the shutter time suitable for flashlight photography which is put out from the output port P7 of the microcomputer. The shutter time controlled by the output port P7 is the highest speed shutter time capable of being synchronized with flashlight photography in the aperture priority mode, the shutter priority mode and the program control mode. When the camera has been automatically changed over to the flashlight photography mode during the manual exposure control mode, the microcomputer 11 discriminates in which of the following relations the camera is:

$$TVM \leqq TV(EF) \tag{30}$$

or $$TVM > TV(EF) \tag{31},$$

where TVM is the shutter time value manually set by the TV setting device 32 and TV(EF) is the highest speed shutter time capable of being synchronized with flashlight photography. In the case of the relation of formula (30), shutter control is effected at any set TVM, and in the case of the relation of formula (31), shutter control is effected not at any set TVM but at TV(EF). The diaphragm is manually set to an aperture value capable of flash output control, by the use of the preset ring of the lens.

(5)-1 Operation before the release

The metering display operation is effected by operating how much the exposure at the AV value set on the basis only of the metering value of the output of A5 and the shutter time value controlled as a result of the discrimination effected by the use of formula (30) or (31) deviates from the value of the relation formula which satisfies proper exposure.

As described under item (4) above, A/D conversion of only the output of A5 is effected and the value of $(BV(A_5) - AV_0)$ is input to the microcomputer 11. When one of the aperture priority mode, the shutter priority mode and the program control mode is set by the mode setting device 33, the shutter time is TV(EF) and therefore, the operation of $$\delta' = (BV(A_5) - AV_0) - (AV - AV_0) + SV - TV(EF) = \tag{32}$$
$$(BV(A_5) + SV) - (AV + TV(EF))$$

is effected by the microcomputer 11. $\delta'$ indicates the deviation value from the relation which satisfies the proper exposure at TV(EF). When the manual exposure control mode is set by the mode setting device 33, TVM or TV(EF) is selected as the shutter time by the discrimination of formula (30) or (31). When the selection of TV(EF) has been effected, the display operation of equation (32) is effected. When the selection of TVM has been effected, the operation of $$\delta'' = (BV(A_5) + SV) - (AV + TVM) \tag{33}$$

is effected by the microcomputer 11. $\delta''$ indicates the deviation value from the relation which satisfies the proper exposure at TVM. One of $\delta'$ and $\delta''$ of equations (32) and (33) operated by the microcomputer 11 is displayed by the display device 28 through the display driving circuit 27. The storage into RAM for preparing for the operation after the release is not effected at all.

(5)-2 Operation after the release

The camera is released and stop-down of the lens is initiated, and the aperture value becomes a value set by the preset aperture ring. The OFF signal of the open memory switch SW4 is input to the microcomputer 11, whereby the aforementioned A/D conversion operation is stopped. When the stop-down of the lens is completed, the stop-down memory switch SW1 becomes open and it is input to the microcomputer 11, whereby the multi-input change-over operational amplifier A22 selects and puts out a voltage for setting the TTL flash output control level produced in the resistor R12 by the control of the output port P9 to a proper exposure value in the relation with the output of the D/A circuit. Also, the D/A conversion output puts out the SV value by the SV setting device 29 with the aid of the microcomputer 11. When the stop-down of the lens is completed, the reflecting mirror retracts and when the retraction is completed, movement of the forward shutter curtain is started. In synchronism with the movement of the forward shutter curtain, the trigger switch SW3 is opened. When the forward shutter curtain completes its movement and the shutter is fully opened, a conventional synchro contact, not shown, is closed and it is transmitted to a flash unit, not shown, through the hot shoe contact, whereupon flashlight emission is started. The OFF signal of the trigger switch SW3 is transmitted to the microcomputer 11 and therefore, the time counting operation is started. Also, by the opening of the trigger switch, the transistor Q3 is rendered non-conductive and the integrating operation of the capacitor C3 is started by the resistor R3. When the voltage of the capacitor C3 reaches a predetermined level in a predetermined time, the output of the comparator A15 changes from L to H and the transistor Q4 becomes non-conductive. The time from after the trigger switch SW3 is opened until the transistor Q4 is rendered non-conductive is set to a time equal to or slightly shorter than the time from after the forward shutter curtain starts to move until the shutter is fully opened. Accordingly, the transistor Q4 becomes non-conductive as soon as or slightly before flashlight emission takes place. The reflected light from the film surface proportional to the quantity of light passed through the diaphragm of the lens and having entered the film surface is metered by the photodiode PD6. The current produced in the photodiode PD6 by the reflected light from the film surface creates a logarithmically compressed voltage in A16, and that voltage is logarithmically expanded by the transistor Q5. That is, by a voltage determined by the voltage of the SV value information which is the output voltage of the operational amplifier A23, a current value resulting from the current of the photodiode PD6 being multiplied by a predetermined magnification is obtained as the collector current of the transistor Q5. The collector current of the transistor Q5 is integrated by the capacitor C4, and the integration voltage of the capacitor C4 is proportional to the time-integrated value of the quantity of light entering the film surface, namely, the exposure amount. When the integration voltage of the capacitor C4 reaches the level of a reference voltage E3, the output of the comparator A17 changes from L to H and it is transmitted to the light emission stopping circuit of the flash unit, not shown, through the hot shoe contact EF1, and the flashlight emission is stopped by this circuit. The amount of integration of the capacitor C4 when the comparator A18 is inverted, that is, the exposure amount of the film surface by the flashlight emission, is set so as to be proper exposure by the voltage produced in the resistor R12 for setting the TTL flash output control level. By the relation of the above-described operation, the TTL flash output control of proper exposure by the electronic flash unit is effected. When the counting of TV(EF) or TVM is completed by the microcomputer 11, the output of the output port P7 becomes L and the supply of electric power to the shutter control magnet Mg1 is stopped, whereby the rearward shutter curtain is closed and the exposure control is completed and the mirror is lowered. Thereby the operation described under item (5)-1 above is again effected.

We claim:

1. A camera in which setting means for setting plural exposure factors is provided and a stop and a shutter are driven in response to a release operation in accordance with said plural exposure factors which are set, comprising:
    (a) metering means which meters the light of a subject to be photographed through the stop and generates a metering signal, the metering signal being an analog signal;
    (b) first control means which produces a first control signal prior to said release operation and which produces a second control signal in response to said release operation in accordance with at least one of said plural exposure factors which are set, the first and second control signals each being a digital signal;
    (c) means for making a first reference signal in accordance with said first control signal and a second reference signal in accordance with said second control signal, the first and second reference signals each being an analog signal;
    (d) means for comparing said first reference signal with said metering signal, the comparing means producing a comparison signal when said first reference signal and said metering signal reach a predetermined relation and said first control means operating, prior to said release operation, to obtain a proper exposure in accordance with said comparison signal and said plural exposure factors to generate an operation output;
    (e) means for indicating in accordance with said operation output; and
    (f) second control means for controlling said shutter in response to said release operation in accordance with said metering signal and said second reference signal.

2. A camera according to claim 1, wherein said at least one of said plural exposure factors includes information relating to the sensitivity of a film.

3. A camera according to claim 2, further comprising means which detects the completion of the driving of said stop to produce a detection signal and wherein said second control means operates an exposure time in response to said detection signal in accordance with said metering signal and said second reference signal, and said first control means causes said first control signal to be changed and effects the operation of said first control means to obtain a proper exposure in accordance with said first control signal when said comparison signal is generated.

4. A camera according to claim 1, wherein said making means includes converting means for converting a digital signal into an analog signal, selecting means for selectively producing, as output, one analog signal from plural analog signals having different levels, and combining means for combining the analog signal of said converting means with said one analog signal of said selecting means.

5. A camera according to claim 4, wherein said first and second control signals each includes a signal supplied as input to said converting means and a selecting signal supplied, as input, to said selecting means, and wherein said selecting means selects one analog signal from said plural analog signals in response to said selecting signal.

6. A camera according to claim 1, wherein flashlight photography can be effected and wherein said first control means produces a third control signal in response to said release operation when flashlight photography by the camera is effected and said making means makes a third reference signal in accordance with said third control signal, and the camera further comprising means which detects the intensity of the light from a subject to be photographed through said stop to produce a light intensity signal, means which detects the full opening of said shutter to produce a shutter detection signal, integration means which integrates said light intensity signal in response to said shutter detection signal and detects an integrated value reaching a predetermined value to produce an output signal, and means for controlling said predetermined value in accordance with said third reference signal, the third control signal being a digital signal and said third reference signal being an analog signal.

7. A camera in which setting means for setting plural exposure factors is provided and a stop and a shutter are driven in response to a release operation in accordance with said plural exposure factors which are set, comprising:
(a) metering means which divides the subject to be photographed into plural regions and meters the light through said stop from the plural regions, the metering means producing, as output, plural metering signals indicative of light at the respective plural regions, said plural metering signals each being an analog signal;
(b) first control means which produces a first control signal prior to said release operation and which produces a second control signal in response to said release operation in accordance with at least one of said plural exposure factors which are set, the first and second control signals each being a digital signal;
(c) means for making a first reference signal in accordance with said first control signal and a second reference signal in accordance with said second control signal, the first and second reference signals each being an analog signal;
(d) means for comparing said first reference signal with said plural metering signals, the comparing means producing a comparison signal when said first reference signal and said plural metering signals reach respectively predetermined relations and said first control means operating, prior to said release operation, to obtain a proper exposure in accordance with said comparison signal and said plural exposure factors to generate an operation output;
(e) means for indicating in accordance with said operation output; and
(f) second control means for controlling said shutter in response to said release operation in accordance with said at least one of said plural metering signals and said second reference signal.

8. A camera according to claim 7, wherein said first control means causes said first control signal to be changed and effects the operation of said first control means to obtain a proper exposure in accordance with said first control signal when said comparison signal is generated, the first control means producing said second control signal in accordance with the result of said operation of said first control means to obtain a proper exposure and said at least one of said plural exposure factors.

9. A camera according to claim 8, further comprising means which detects the completion of the operation of said stop to produce a detection signal and wherein said second control means operates an exposure time in response to said detection signal in accordance with said metering signal and said second reference signal.

10. A camera according to claim 8, wherein said making means includes converting means for converting a digital signal into an analog signal, selecting means for selectively producing as output one analog signal from plural analog signals having different levels, and combining means for combining the analog signal of said converting means with said one analog signal of said selecting means.

11. A camera according to claim 10, wherein said first and second control signals each includes a signal supplied, as input, to said converting means and a selecting signal supplied, as input, to said selecting means, and wherein said selecting means selects one analog signal from said plural analog signals in response to said selecting signal.

12. A camera according to claim 7, wherein flashlight photography can be effected and wherein said first control means produces a third control signal in response to said release operation when flashlight photography by the camera is effected and said making means makes a third reference signal in accordance with said third control signal, and the camera further comprising means which detects the intensity of the light from a subject to be photographed through said stop to produce a light intensity signal, means which detects the full opening of said shutter to produce a shutter detection signal, integration means which integrates said light intensity signal in response to said shutter detection signal and detects an integrated value reaching a predetermined value to produce an output signal, and means for controlling said predetermined value in accordance with said third reference signal, the third control signal being a digital signal and said third reference signal being an analog signal.

13. A camera provided with setting means for setting plural exposure factors, stop driving means for driving a stop in the direction of a predetermined stop value and shutter driving means for driving a shutter, comprising:
(a) metering means which meters the light of a subject to be photographed through said stop to produce a metering signal, the metering signal being an analog signal;
(b) terminating means for terminating the driving of said stop;
(c) means for producing a detection signal after said terminating means terminates the driving of said stop;
(d) first control means for selectively producing, as output, first, second and third control signals, the first control means producing said first control signal prior to said release operation, producing said second control signal in response to said release operation in accordance with said plural exposure factors which are set, and producing said third control signal in response to said detection signal in accordance with at least one of said plural exposure factors which are set, said first, second and third control signals each being a digital signal;

(e) making means which makes a first reference signal in accordance with said first control signal, a second reference signal in accordance with said second control signal, and a third reference signal in accordance with said third control signal, the first, second and third reference signals each being an analog signal and said terminating means terminating the driving of said stop when the difference between said metering signal and said second reference signal reaches a predetermined value;

(f) comparing means for comparing said first reference signal with said metering signal, the comparing means producing a comparison signal when said first reference signal and said metering signal reach a predetermined relation, said first control means operating, prior to said release operation, to obtain a proper exposure in accordance with said comparison signal and said plural exposure factors to generate an operation output;

(g) means for indicating in accordance with said operation output; and (h) second control means for controlling said shutter in response to said detection signal in accordance with said metering signal and said third reference signal.

14. A camera according to claim 13, wherein said first control means causes said first control signal to be changed and the first control means carries out the operation of said first control means to obtain a proper exposure in accordance with said first control signal when said comparison signal is generated and produces said second control signal in accordance with the result of said operation of said first control means to obtain a proper exposure and with said plural exposure factors.

15. A camera according to claim 14, wherein said making means includes converting means for converting a digital signal into an analog signal, selecting means for selectively producing, as output, one analog signal from plural analog signals having different levels, and combining means for combining the analog signal of said converting means with said one analog signal of said selecting means.

16. A camera according to claim 15, wherein said first, second and third control signals each includes a signal supplied, as input, to said converting means and a selecting signal supplied, as input, to said selecting means, said selecting means selecting one analog signal from said plural analog signals in response to said selecting signal.

17. A camera according to claim 13, wherein said camera is capable of effecting flashlight photography, and wherein said first control means does not produce said first and second control signals but produces a fourth control signal in reponse to said release operation when said camera effects flashlight photography, and said making means makes a fourth reference signal in accordance with said fourth control signal, and said camera further comprising means which detects the intensity of light through said stop from a subject to be photographed to produce a light intensity signal, means which detects said shutter being fully open to produce a shutter detection signal, integration means which integrates said light intensity signal in response to said shutter detection signal and which detects that an integrated value reaches a predetermined value to generate an output signal, and means for controlling said predetermined value in accordance with said fourth reference signal, said fourth control signal being a digital signal and said fourth reference signal being an analog signal.

18. A camera provided with setting means for setting plural exposure factors, stop driving means which drives a stop in the direction of a predetermined stop value and shutter driving means which drives a shutter, comprising:

(a) metering means which divides a subject to be photographed into plural regions and meters the light through said stop from the plural regions, the metering means producing, as output, plural metering signals indicative of light at the respective plural regions, said plural metering signals each being an analog signal;

(b) terminating means for terminating the driving of said stop;

(c) means for producing a detection signal after said terminating means has terminated the driving of said stop;

(d) first control means for selectively producing, as output, first, second and third control signals, the first control means producing said first control signal prior to said release operation, producing said second control signal in response to said release operation in accordance with said plural exposure factors which are set, and producing said third control signal in response to said detection signal in accordance with said plural exposure factors which are set, each of said first, second and third control signals being a digital signal;

(e) making means which makes a first reference signal in accordance with said first control signal, a second reference signal in accordance with said second control signal, and a third reference signals in accordance with said third control signal, each of said first, second and third reference signals being an analog signal, said terminating means terminating the driving of said stop when the difference between said metering signal and said second reference signal reaches a predetermined value;

(f) comparing means for comparing said first reference signal with said plural metering signals, the comparison means producing a comparison signal when said first reference signal and said plural metering signals reach a predetermined relation, said first control means operating, prior to said release operation, to obtain a proper exposure in accordance with said comparison signal and with said plural exposure factors to produce an operation output;

(g) means for indicating in accordance with said operation output; and (h) second control means for controlling said shutter in response to said detection signal in accordance with at least one of said plural metering signals and said third reference signal.

19. A camera according to claim 18, wherein said first control means causes said first control signal to be changed, carries out the operation of said first control means to obtain a proper exposure in accordance with said first control signal when said comparison signal is produced, and produces said second and third control signals in accordance with the result of said operation of said first control means to obtain a proper exposure and at least one of said plural exposure factors.

20. A camera according to claim 19, wherein shutter control means operates exposure time in response to said detection signal in accordance with said at least one of said plural metering signals and said third reference signal.

21. A camera according to claim 19, wherein said making means includes converting means for converting a digital signal into an analog signal, selecting means for selectively producing, as output, one analog signal from plural analog signals having different levels, and combining means for combining the analog signal of said converting means with said one analog signal of said selecting means.

22. A camera according to claim 21, wherein said first, second and third control signals each includes a signal supplied, as input, to said converting means and a selecting signal supplied, as input, to said selecting means, said selecting means selecting one analog signal from said plural analog signals in response to said selecting signal.

23. A camera according to claim 18, wherein said camera is capable of effecting flashlight photography, and wherein said first control means does not produce said first and second control signals but produces a fourth control signal in response to said release operation when said camera effects flashlight photography, and said making means makes a fourth reference signal in accordance with said fourth control signal, and said camera further comprising means which detects the intensity of light through said stop from a subject to be photographed to produce a light intensity signal, means which detects said shutter being fully open to produce a shutter detection signal, integration means which integrates said light intensity signal in response to said shutter detection signal and detects that an integrated value reaches a predetermined value to generate an output signal, and means for controlling said predetermined value in accordance with said fourth reference signal, said fourth control signal being a digital signal and said fourth reference signal being an analog signal.

24. A camera provided with driving means which drives a stop in the direction of a predetermined stop value in response to a release operation, comprising:
(a) metering means which meters the light of a subject to be photographed through said stop to produce a metering signal;
(b) making means for making an output signal in response to said metering signal, the output signal changing in the direction opposite to the direction in which said metering signal changes;
(c) comparing means which compares said metering signal with said output signal of said making means, the comparing means producing a comparison signal when the difference between said metering signal and said output signal of said making means reaches a predetermined value;
(d) terminating means for terminating said driving of said stop in response to said comparison signal; and
(e) means for detecting said release operation to produce a detection signal;
said making means including memory means for storing information in response to said detection signal in accordance with said metering signal, and means for making said output signal of said making means in accordance with information memorized in said memory means and said metering signal.

25. A camera according to claim 24, wherein said output signal of said making means is an analog signal, and further comprising setting means for setting plural exposure factors, means which detects that said terminating means terminates the driving of said driving means to produce a detection signal, means for producing a first information signal in response to said release operation and producing a second information signal in response to the detection signal in accordance with said plural exposure factors which are set, converting means for converting a digital signal into an analog signal, combining means for combining the analog signal of said converting means with the analog signal of said making means, said first and second information signals each being a digital signal and said converting means converting said first and second information signals into an analog signal.

26. A camera according to claim 24, wherein said comparing means includes means for phase-shifting said metering signal.

27. A camera according to claim 24, wherein said output signal of said making means is an analog signal, and further comprising setting means for setting plural exposure factors, means which detects that said terminating means terminates the driving of said driving means to produce a detection signal, means for producing a first information signal in response to said release operation and producing a second information signal in response to the detection signal in accordance with said plural exposure factors which are set, converting means for converting a digital signal into an analog signal,
  means for producing an analog signal having a predetermined level, selecting means for selecting one of said output signal of said making means and said signal of a predetermined level, means for producing a first selecting signal in response to said release operation and producing a second selecting signal in response to said detection signal, means for controlling exposure time, and combining means for combining the analog signal of said converting means with the analog signal selected by said selecting means to produce an output signal, said first and second information signals each being a digital signal and said converting means converting said first and second information signals into an analog signal,
  said selecting means selecting said output signal of said making means in response to said first selecting signal and selecting said signal of a predetermined level in response to said second selecting signal,
  said means for controlling exposure time operating exposure time in response to said detection signal in accordance with said output signal of said combining means and said metering signal.

28. A camera having setting means for setting plural exposure factors, stop driving means which drives a stop in the direction of a predetermined stop value in response to a release operation and shutter driving means which drives a shutter, comprising:
(a) metering means which meters the light of a subject to be photographed through the stop and produces a metering signal, the metering signal being an analog signal;
(b) terminating means for terminating the driving of said stop;

(c) first control means for selectively producing, as output, first and second control signals, the first control means producing said first control signal in response to said release operation in accordance with said plural exposure factors which are set, the first control means producing said second control signal in accordance with at least one of said plural exposure factors which are set, after said terminating means terminates said stop driving, said first and second control signals each being a digital signal;

(d) making means having means converting a digital signal into an analog signal, the making means making a first reference signal in accordance with said first control signal and making a second reference signal in accordance with said second control signal, said first and second reference signals each being an analog signal, said terminating means terminating said stop driving when the difference between said metering signal and said first reference signal reaches a predetermined value; and (e) second control means which controls said shutter driving means in accordance with said metering signal and said second reference signal after said terminating means has terminated said stop driving.

29. A camera having setting means for setting plural exposure factors, stop driving means which drives a stop in the direction of a predetermined stop value and shutter driving means which drives a shutter, comprising:

(a) metering means which divides a subject to be photographed into plural regions and meters the light through said stop from said plural regions, said metering means producing, as output, plural metering signals indicative of light at the respective plural regions, said plural metering signals each being an analog signal;

(b) terminating means which terminates the driving of said stop;

(c) first control means for selectively producing first and second control signals, the first control means producing said first control signal in response to said release operation in accordance with said plural exposure factors which are set, the first control means producing said second control signal in accordance with at least one of said plural exposure factors which are set, after said terminating means has terminated said stop driving, said first and second control signals each being a digital signal;

(d) making means having means for converting a digital signal into an analog signal, the making means making a first reference signal in accordance with said first control signal and making a second reference signal in accordance with said second control signal, said first and second reference signals each being an analog signal, said terminating means terminating said stop driving when the difference between at least one of said plural metering signals and said first reference signal reaches a predetermined value; and (e) second control means for controlling said shutter driving means in accordance with said at least one of said plural metering signals and said second reference signal, after said terminating means has terminated said stop driving.

* * * * *